United States Patent
Baumgarten et al.

(10) Patent No.: US 9,220,196 B2
(45) Date of Patent: Dec. 29, 2015

(54) METHOD FOR ADJUSTING AT LEAST ONE WORKING UNIT OF A SELF-PROPELLED HARVESTING MACHINE

(75) Inventors: Joachim Baumgarten, Beelen (DE);
Sebastian Neu, Bar Laer (DE);
Christoph Bussmann, Harsewinkel (DE); Andreas Wilken, Bissendorf (DE); Henner Voecking, Rietberg (DE);
Christoph Heitmann, Warendorf (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 53 days.

(21) Appl. No.: 13/113,555

(22) Filed: May 23, 2011

(65) Prior Publication Data
US 2012/0004813 A1    Jan. 5, 2012

(30) Foreign Application Priority Data

Jul. 1, 2010 (DE) .......................... 10 2010 017 687

(51) Int. Cl.
*A01D 41/127* (2006.01)
(52) U.S. Cl.
CPC .................................. *A01D 41/127* (2013.01)
(58) Field of Classification Search
USPC ...................................................... 701/50, 24
See application file for complete search history.

(56) References Cited

U.S. PATENT DOCUMENTS

| | | | | |
|---|---|---|---|---|
| 4,259,829 A | * | 4/1981 | Strubbe | 460/5 |
| 4,466,231 A | * | 8/1984 | Rowland-Hill et al. | 460/2 |
| 4,875,889 A | * | 10/1989 | Hagerer et al. | 460/1 |
| 5,586,033 A | * | 12/1996 | Hall | 701/50 |
| 5,775,072 A | * | 7/1998 | Herlitzius et al. | 56/10.2 R |
| 6,076,030 A | * | 6/2000 | Rowe | 701/50 |
| 6,468,154 B1 | * | 10/2002 | Eggenhaus et al. | 460/101 |

(Continued)

FOREIGN PATENT DOCUMENTS

| | | | | |
|---|---|---|---|---|
| DE | 4035471 A1 | * | 5/1991 | A01F 12/50 |
| DE | 197 05 841 | | 8/1998 | |

(Continued)

OTHER PUBLICATIONS

Maertens, J. et al. Design of a Virtual Combine Harvester, Laboratory for Agro Machinery and Processing, Kasteelpark Arenberg, 30, B-3001, Lueven, Belgium, Mathematics and Computers in Simulation 65 (2004) 49-57 (http://ac.els-cdn.com/S037847540300140X/1-s2.0-S037847540300140X-main.pdf?_tid=1cc4983c-d6bb-11e3-877a-00000aab0f6b&acdnat=1399558668_12b.*

*Primary Examiner* — John R Olszewski
*Assistant Examiner* — Jean-Paul Cass
(74) *Attorney, Agent, or Firm* — Michael J. Striker (57) ABSTRACT

A method for automatic adjustment of at least one of several working units of a self-propelled harvesting machine involved in a harvesting process, includes the steps of initially modeling the harvesting process by at least one program map, based on a data base characteristic of a current harvesting process; determining an initial working point of the at least one of the working units on a basis of the initial modeling; adapting the at least one program map on a basis of data currently collected by measurements and which influence the harvesting process; determining a new working point of the at least one working unit depending on the adaptation of the program map; and iteratively approximating the new working point.

17 Claims, 6 Drawing Sheets

(56) References Cited

U.S. PATENT DOCUMENTS

| | | | |
|---|---|---|---|
| 6,553,300 B2 * | 4/2003 | Ma et al. | 701/50 |
| 6,587,772 B2 * | 7/2003 | Behnke | 701/50 |
| 6,632,136 B2 * | 10/2003 | Anderson et al. | 460/101 |
| 6,863,604 B2 * | 3/2005 | Behnke | 460/6 |
| 6,869,355 B2 * | 3/2005 | Bernhardt et al. | 460/4 |
| 7,343,262 B2 * | 3/2008 | Baumgarten et al. | 702/129 |
| 7,572,180 B2 * | 8/2009 | Ricketts et al. | 460/101 |
| 7,584,663 B2 * | 9/2009 | Missotten et al. | 73/579 |
| 7,610,125 B2 | 10/2009 | Fitzner et al. | |
| 7,630,808 B2 * | 12/2009 | Behnke et al. | 701/50 |
| 7,630,809 B2 * | 12/2009 | Behnke et al. | 701/50 |
| 7,670,218 B2 * | 3/2010 | Behnke et al. | 460/4 |
| 7,713,115 B2 * | 5/2010 | Behnke et al. | 460/1 |
| 7,930,044 B2 * | 4/2011 | Attarwala | 700/44 |
| 8,019,701 B2 * | 9/2011 | Sayyar-Rodsari et al. | 706/12 |
| 8,161,718 B2 * | 4/2012 | Bussmann et al. | 56/10.2 G |
| 8,676,453 B2 * | 3/2014 | Behnke et al. | 701/50 |
| 2006/0123757 A1 * | 6/2006 | Baumgarten et al. | 56/10.2 R |
| 2009/0126327 A1 * | 5/2009 | Bussmann et al. | 56/10.2 A |
| 2010/0057222 A1 * | 3/2010 | Turner et al. | 700/31 |
| 2010/0217474 A1 * | 8/2010 | Baumgarten et al. | 701/29 |

FOREIGN PATENT DOCUMENTS

| | | | | |
|---|---|---|---|---|
| DE | 10 2005 031 426 | | 1/2007 | |
| EP | 586999 | * | 3/1994 | |
| EP | 586999 A2 | * | 3/1994 | G05B 13/02 |
| EP | 2550852 A1 | * | 1/2013 | |
| WO | WO 0202152 | * | 1/2002 | |

* cited by examiner

METHOD FOR ADJUSTING AT LEAST ONE WORKING UNIT OF A SELF-PROPELLED HARVESTING MACHINE

CROSS-REFERENCE TO RELATED APPLICATION

U.S. patent application Ser. No. 12/113,270 filed on May 23, 2011, and claiming priority from the German Patent Application DE 10 2010 017 676.1 filed on Jul. 1, 2010, can have a subject matter which is similar to the subject matter disclosed in the present application.

The invention described and claimed hereinbelow is also described in German Patent Application DE 10 2010 017 687.7 filed on Jul. 7, 2010. This German Patent Application, whose subject matter is incorporated here by reference, provides the basis for a claim of priority of invention under 35 U.S.C. 119(a)-(d).

BACKGROUND OF THE INVENTION

The invention relates to a method for adjusting at least one of a plurality of working units of a self-propelled harvesting machine involved in a harvesting process.

Document DE 197 05 841 A1 makes known a method for operating an agricultural harvesting machine, in which a processing step is adjusted automatically depending on a result. For this purpose, feedback control is used to monitor the setting of the working step with respect to crossing over limit values, and a notice is output to an operator if a limit value was crossed over. Moreover, the feedback control is designed to react automatically to the crossing over of a limit value, and to automatically implement appropriate measures which result in the setting for the working step being returned to the range below the limit value.

In order to adjust the setpoint values and the limit values, the method known from DE 197 05 841 A1 accesses information stored in a memory unit, which is selected depending on the kind of crop entered by the operator. This information is used as setpoint values for adjusting a processing step, on the basis of which the setpoint/actual value comparison is carried out, which forms the basis for the feedback control. The actual value is ascertained using appropriate sensors which monitor the processing steps and transmit to an evaluation unit in which the setpoint/actual comparison is carried out.

The method disclosed in DE 197 05 841 A1 makes it possible to relieve the operator of the harvesting machine of the task of making the necessary adjustments to working units to implement the processing steps of the harvesting machine, but the method is dependent on the quality of the specified information for adjusting or selecting a setpoint value of the working units. A reaction to changing conditions, e.g. during an on-going harvesting process or if used on different fields of the same kind of crop, is not provided.

Generic document DE 10 2005 031 426 A1 makes known a method for automatically adjusting operating parameters of an agricultural working machine, according to which a program map is subdivided into a plurality of sub-program maps that are dependent on an operating parameter. One working machine is assigned to each sub-program map, and is operated according to the proposed operating parameter settings which result from the sub-program map. During operation of the working machine, data ascertained by sensors are used to check the working result which is influenced by changes made to the operating parameters, in order to optimize the particular sub-program maps. A limiting aspect of said method is that an optimal operating parameter that is determined is not applied until a trained operator selects it as a setting, or until the currently selected operating parameter is adjusted depending on a certain threshold value, as provided in DE 197 05 841 A1.

SUMMARY OF THE INVENTION

The problem addressed by the present invention is that of providing a method of the initially stated type which relieves the operator and permits a more flexible reaction to changing basic conditions during the harvesting process.

According to the invention, an initial modeling of the harvesting process is carried out by at least one program map which is based on a data base characteristic of the harvesting process currently underway. The initial modeling of the harvesting process forms the basis for a basic adjustment of the working units of the harvesting machine. On the basis of the initial modeling of the harvesting process, an initial working point of the at least one working unit to be adjusted is determined. After an initial working point has been determined, the at least one program map is adjusted on the basis of data which were obtained by measurements and influence the harvesting process. The adaptation of the program map results in the determination of a new working point of the at least one working unit. At this new working point, which results from the previous step of adapting the program map, the setting of the working unit is approximated in an iterative process starting from the initial working point.

A main advantage of this method is that the program map used to model the current harvesting process tracks the current harvesting process that is subject to continual changes, and therefore the settings of the at least one working unit are adapted to the continually changing harvesting conditions, in order to attain or maintain operation of the least one working unit as close to the optimal working point as possible. This procedure ensures that the method according to the invention is highly adaptable to changing harvesting conditions which can be considered when adjusting the at least one working unit. The iterative approximation continuously reduces the difference from the optimal adjustment parameters. Since the method according to the invention is carried out in an automated manner, the operator does not need to have a deep understanding of the processes and the interactions between the working units of an agricultural harvesting machine which often exist, thereby enabling him to concentrate mainly on other tasks during the harvesting process.

For the initial modeling of the harvesting process, a basic parametrization of the at least one program map can be carried out, on the basis of which initial adjustment parameters of the at least one working unit are determined. The basic parametrization can be carried out on the basis of evaluated data from earlier harvesting processes and/or specific information on the combine harvester and/or the historical experience of operators, which can be stored in a control unit for executing the method. At the beginning of a harvesting process, the basic behavior of the individual working units and the working unit-specific interactions thereof are depicted in the basic parametrization, and initial adjustment parameters of the working units are defined. To refine the basic parametrization, the operator can provide additional information such as the kind of crop to be harvested, on the basis of which the initial modeling of the at least one program map is carried out using the specific information stored for this kind of crop. Measurements of the data that influence the harvesting process, which are carried out for the entire period of time during which a field is harvested, and the evaluation thereof are sources for expanding the data base which can be used for the basic parametrization of the at least one program map.

Advantageously, after an approximation step, the initial adjustment parameters of the at least one working unit can be adapted to the newly determined working point. In this method step, the initial adjustment parameters of the at least one working unit determined in the basic parametrization can be adapted to the harvesting conditions that actually exist at the moment. This procedure also helps to increase the variation of the data base used for the basic parametrization.

In a preferred development, after one approximation step toward the new working point, a wait ensues until a quasistationary machine behavior is reached. Waiting for a quasistationary machine behavior to set in reduces the amount of calculating work required to adapt the at least one program map, since dynamic components such as start-up or shutdown processes are not taken into consideration when changing the settings of a working unit.

A validation of the adapted program map can also be carried out. In this method step, the deviation of the model resulting from the adaptation of the program map from the actual harvesting conditions can be determined. Depending on the order of magnitude of the deviations of the model from the actual process conditions to be modelled, a decision can be made as to whether to change the program map. If the program map is adapted, then, subsequent thereto, a static comparison of the variables characterizing the program map can be carried out before and after the adaptation.

Depending on the result of the validation of the adapted program map, the resulting values for the adjustment parameters of the working units can be retained or reset to the values corresponding to the previously determined working point.

Moreover, the working point resulting from the adaptation of the program map can be checked for plausibility. The variables relevant to the harvesting process, such as losses due to cleaning, grain portions in the tailings, etc., can be used here as the reference variables. For this purpose, after the plausibility check, the adjustment parameters resulting from the newly determined working point which is approximated incrementally are subjected to an analysis based on expert knowledge stored in the control/regulating unit, wherein the expert knowledge accounts for the interrelationships between various efficiency parameters, quality criteria, and working parameters of the working units.

As an alternative, the adaptation of the at least one program map can be carried out dynamically. Dynamic adaptation or disregarding the fluctuation of the harvesting machine until a quasistationary state is reached has the advantage that changes in the harvesting conditions can be detected virtually in real time and accounted for in the adaptation of the program map.

Advantageously, the at least one working unit can be adjusted depending on the quantity of crop material supplied to the crop machine, e.g. by measuring the layer thickness in the feeder housing, on the basis of which the throughput of the supplied quantity of crop material is derived. Likewise, the longitudinal and/or transverse inclination of the harvesting machine, which is determined using appropriate sensors on the harvesting machine, can be taken into account in the adjustment of the at least one working unit.

Moreover, the at least one working unit can be adjusted depending on the quantity of crop material supplied to the working unit. This can take place in addition to or independently of the total quantity of crop material supplied to the harvesting machine. By subdividing the quantity of crop material into grain components and non-grain components, the working units can be adjusted in a goal-oriented manner.

In particular, the adjustment method can be interrupted automatically by a manual influence on an adjustment parameter. It makes sense to deactivate the automated operation in that an operator intervenes manually in the operation of the harvesting machine when the external circumstances during the harvesting process are such that intervention by an operator is required to override the automated operation for the duration of the intervention.

In a preferred development of the method, data that are obtained by measurements carried out during the harvesting process, and which influence the harvesting process, are detected and stored. These data can be used for subsequent harvesting processes to base the procedure of initial modeling on an increasingly expanding data base, thereby continuously refining the data base and continuously accelerating the approximation of the optimal working point, since the deviations between the initial working point and the optimal working point, which is controlled according to the method, diminish, said deviations resulting from the particular harvesting conditions prevailing at the moment.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
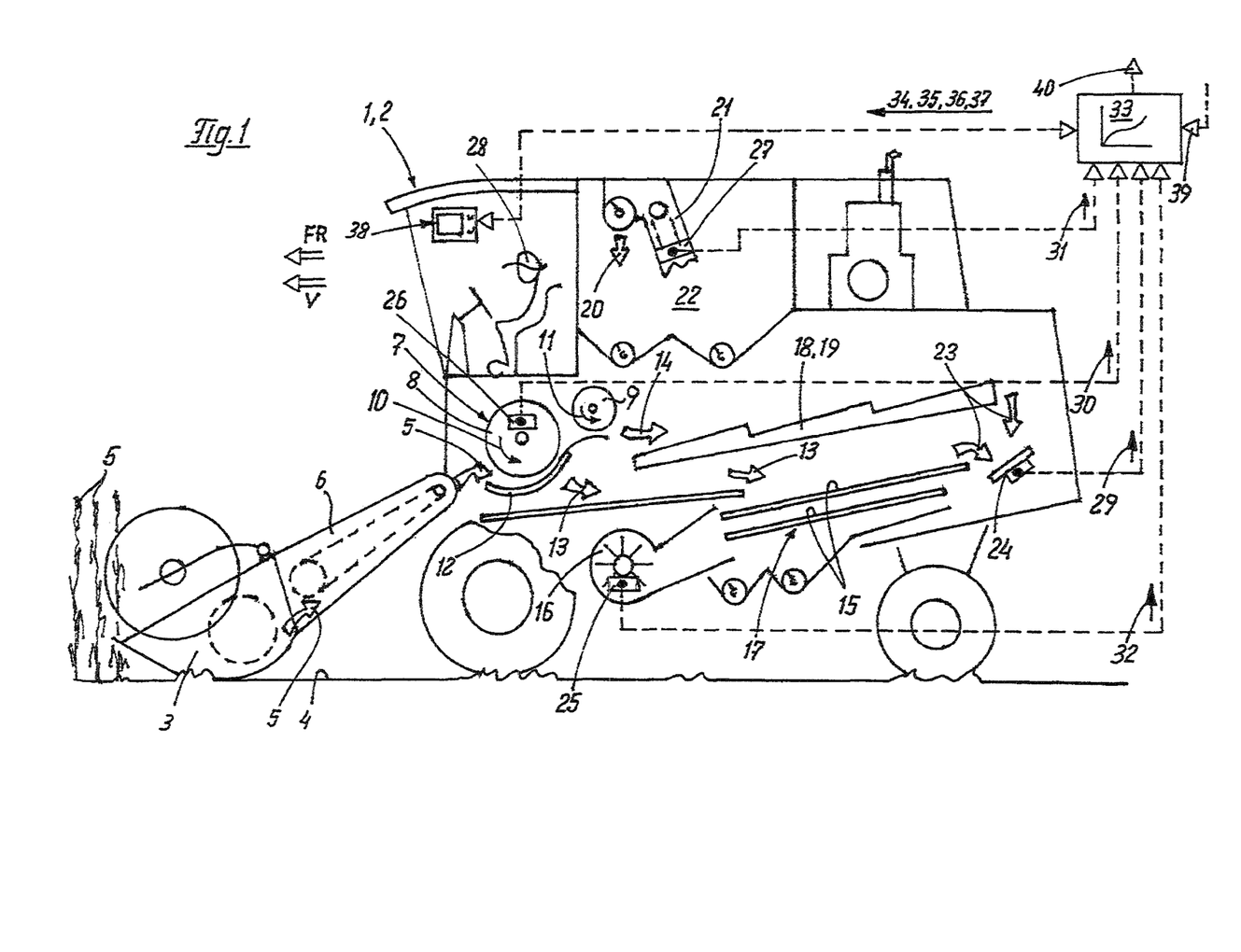
FIG. 1 shows a schematicized side view of an agricultural harvesting machine.

The method according to the invention for optimizing adjustable parameters of working units is described first in the general form thereof by reference to an agricultural harvesting machine 1 designed as a combine harvester 2 and shown in FIG. 1. The term "working unit" used below refers to any component on a harvesting machine that is involved in the harvesting process and that influences the harvesting process, either directly or indirectly. A grain-cutting device 3 which is assigned to combine harvester 2 in the front region thereof, which faces the direction of travel FR, harvests crop 5 growing on ground 4, combines it and supplies it to a feed rake 6 of combine harvester in rear region thereof. Feed rake 6 transfers crop 5 in the rear region thereof to a threshing part 7 which, in the embodiment shown, is composed of a cylinder 8 and a downstream impeller 9. It is within the scope of the invention for threshing part 7 to comprise a plurality of cylinders 8 in a manner known per se, or to be designed as "axial threshing rotors" and "separating rotors".

Crop material 5 is conveyed along a threshing and separating grate 12 into the rear region of threshing part 7 by the rotary motion of cylinders 8 and downstream impeller 9. Flow of crop material 5 is divided into various streams of crop material 13, 14. Stream of crop material 13 separated by threshing and separating grate 12 consists mainly of grain, and stream of crop material 14 which is discharged in the rear region of threshing part 7 consists mainly of straw. Once streams of crop material 13, 14 exiting threshing part 7 have passed through further working units, e.g., a cleaning unit 17 composed of one or more sieve levels 15 and a blower 16 assigned to said sieve levels 15, and a separating unit 19 designed as a tray-type shaker 18, which can also be designed as a separating rotor, grain 20 which is now substantially free of admixtures, is directed via feed devices 21, which are not shown in greater detail, to a storage device 22 located on combine harvester 2. Depending on the working quality of threshing part 7, cleaning unit 17, and separating unit 19, and the quality of crop material 5, a grain flow 23 of lesser or greater magnitude emerges from combine harvester 2 in rear region thereof. Grain flow 23 constitutes the "grain loss" which can be determined using grain loss sensors 24, which are known per se and are therefore not explained in greater detail. It is the objective of operator 28 of such agricultural harvesting machines 1 to keep said grain loss 23 to a minimum.

Depending on the equipment level, in addition to above-described grain sensors 24, combine harvester 2 could therefore be equipped with additional sensors 25, 26, 27 which, in the simplest case, were in the form of rotational speed sensors 25, 26, for instance, for determining the rotational speed of blower 16 or cylinder 8 or the separating rotor. Furthermore, it was already known to use "throughput sensors" 27 which determine grain quantity 20 passing through combine harvester 2. In conjunction with the determination of throughput, it is also important to mention the use of layer thickness sensors in feeder housing 6. Signals 29-32 generated by various sensors 24-27 were converted in a control/regulating unit 33 disposed in combine harvester 2 into, for instance, cylinder speed signals 34, grain-loss signals 35, grain-throughput signals 36, and blower speed signals 37, which were then displayed to operator 28 via a display unit 38 either permanently or only when called up. It is also known to use grain sensors 22 to determine the losses from individual working units, such as cleaning unit 17 or separating unit 19, instead of total grain losses 23. It is also known from the prior art to determine the portion of damaged grain in the grain flow 20 which has been harvested, and to display this information to operator 28. Control/regulating unit 33 can also receive information 39 from external systems or transmit information 40 to external systems.

Due to the approach of determining adjustment parameters for the individual working units while adhering to a specifiable objective such as a grain-loss limit or increased output in the sense of a greater rate of work or increased throughput while maintaining consistent quality, it is very difficult to attain an optimal setting of the working units, even for operators who are skilled in the handling of harvesting machines, due to the many different adjustment parameters which are interrelated in particular. The adjustment methods known from the prior art access default values for a specific harvesting situation that exists, on the basis of which adjustment parameters are then proposed for the particular working unit without accounting for any possible interactions with other working units. However, the methods according to the initially stated prior art respond to conditions that change in the course of the harvesting process, due solely to a specific intervention in the process by an operator who varies an adjustment parameter for a working assembly, or if a limit value range for an adjustment parameter has been crossed over.

For example, DE 10 2005 031 426 A1 provides that a newly determined adjustment parameter must be verified by an operator before it is implemented. The decision as to whether the newly determined setting value results in an improvement in the harvesting process is up to the operator and is therefore dependent on his expert knowledge, which can differ from person to person. Any effects on other working units that may be affected directly by this setting change are likewise unaccounted for.

At this point the method according to the invention is implemented in order to design the process of performing an automatic adjustment independently of an operator's expert knowledge, thereby relieving the operator to a further extent than is the case with the method provided in DE 10 2005 031 426 A1. The method according to the invention for performing an automatic adjustment of at least one of a plurality of working units of a self-propelled harvesting, machine, which interact in a harvesting process, is characterized by the following method steps:

At the beginning of the harvesting process, an initial modeling of the harvesting process, which is based on a data base characteristic for the harvesting process underway, is carried out by determining at least one program map. Next, an initial working point of the at least one working unit is determined on the basis of the initial modeling, and is used to start up the self-propelled harvesting machine. During on-going operation, the at least one program map is adapted continuously on the basis of data currently obtained by measurement and which influence the harvesting process, in order to react to changing harvesting conditions which influence a specifiable objective. Depending on the adaptation of the program map, a new working point of the at least one working unit, which has the optimal setting value for the selected objective, is determined. The approximation of the new working point is carried out using an iterative process, and therefore external influences are continuously accounted for in the automatic adjustment process.

Figure 2:
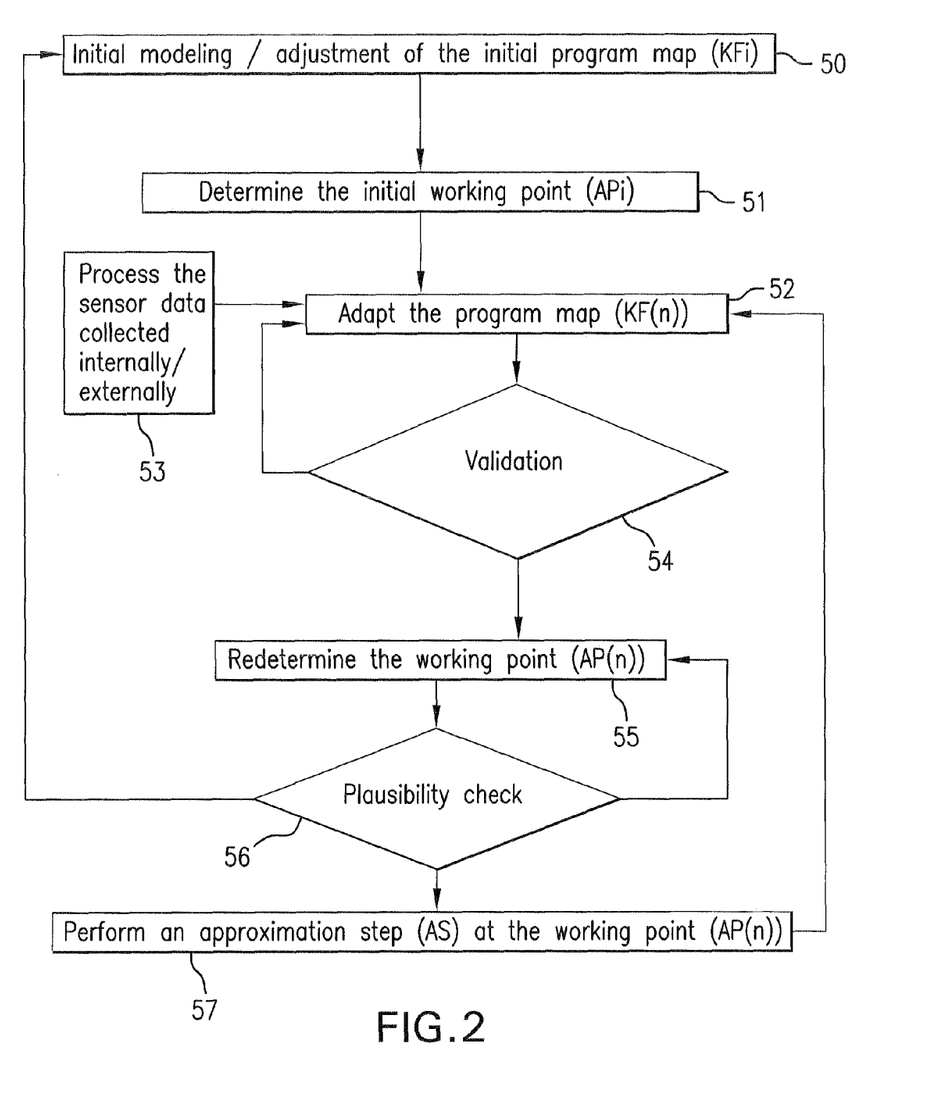
FIG. 2 shows a flow chart of a first embodiment of the method in accordance with the present invention.

The method steps are described below with reference to a flow chart as shown in FIG. 2, which depicts a first embodiment of the method. At the beginning of the automation process, an initial model of the harvesting process is provided in a first step 50. Before the model is initialized, at least one input variable and one output variable which are decisive for feedback control must be selected. An input variable could be derived from the specification of the kind of crop, for instance, on the basis of which the rotor speed of a separating rotor to be set for the specific kind of crop can be derived. An output variable could be adherence to a certain value for loss due to cleaning, for instance. On the basis of said input variable and output variable, at least one initial program map KFi is determined at the beginning of the harvesting process in order to perform the initial modeling thereof. The at least one initial program map KFi determined in step 50 describes the fundamental behavior of at least one of the working units of harvesting machine 1 involved in a harvesting process, and the possible interactions thereof, provided they exist. The basic parametrization of the initial program map KFi is carried out, for instance, on the basis of evaluated data which were gathered in previous harvesting processes, and/or specific information about harvesting machine 1 and/or the experiential knowledge of operators that was collected. The initial program map KFi forms the basis for determining an initial working point APi in step 51, which is used to determine the adjustment parameters of the working units at the start of a harvesting process.

In a subsequent step 52, the program map KF is adapted in order to adapt to changing conditions during the current harvesting process. Proceeding from the initial program map KFi, a new program map KF(n) is determined in the initial adaptation during the harvesting process. The indices between parentheses define the number of adaptations of a program map carried out during the harvesting process. The measurement data captured continuously in a step 53 from sensors 25-27 disposed on combine harvester 2, in particular the information related to the crop flow within combine harvester 2, and data from external sensors not disposed on combine harvester 2, which represent the conditions that currently exist during the harvesting process on the field, are utilized to adapt the program map KF(n). This information is used to continuously adapt the program map KF(n) to the actual conditions during the current harvesting process.

Every adaptation of a program map KF(n) is validated in a step 54 in order to determine whether the newly determined program map KF(n) correlate in a comparison with statistically evaluated data from previous harvesting processes, which are retained for the method. If the newly determined program map KF(n) and the corresponding data used in the comparison diverge to a definable extent, the adaptation according to the program map KF(n) is returned to the previously valid values of the program map KF(n−1). The process of adapting the program map KF(n) is carried out once more in step 52 on the basis of new data that were collected by the sensors in the meantime.

Upon successful validation in step 54, a new working point AP(n) is determined in a subsequent step 55 proceeding from the initially determined working point APi. The previous working point AP(n−1) is always used as the basis for the subsequent handling of step 55 in which a new working point AP(n) is determined.

In step 56 the newly determined working point AP(n) is subjected to a plausibility check to prevent adjustment parameters from being output due to the newly determined working point AP(n) that would rule out a meaningful harvesting operation. Examples in this case would be rotor speeds that are too high or too low, or a setting of the sieve width of cleaning unit 17 that is too small or too large. For this purpose, the adjustment parameters resulting from the newly determined working point AP(n) which is approximated incrementally are subjected to an analysis during the plausibility check, on the basis of expert knowledge stored in control/regulating unit 33, wherein the expert knowledge takes into account the interrelationships of various efficiency parameters, quality criteria, and working parameters of the working units. For example, the grain loss due to cleaning is a contrary quality criterium for increasing the rotational speed of cleaning fan 16 in order to improve the cleanliness of the grain during the incremental approximation of the working point AP(n), since an increase in air flow through cleaning device 17 increases the risk that grains will be blown out of cleaning device 17, thereby resulting in a worsening of the efficiency parameter "grain loss". Contrary efficiency parameters and/or quality criteria are checked in this regard in step 56. If no deviations of a contrary efficiency parameter and/or quality criterium are identified, the approximation step AS is carried out at the working point AP(n), which was determined, in subsequent step 57. However, if an impermissible deviation of the contrary efficiency parameters and/or quality criteria is found, the plausibility check in step 56 proceeds to step 55.

As described above, if the new working point AP(n) was confirmed in the plausibility check in step 56, an approximation step AS toward working point AP(n) is carried out in subsequent step 57. An increment SW(n) must be determined before an approximation step AS can be carried out. The increment SW(n) is defined for the first time by calculating the difference of the working point AP(n) determined in step 55 and the working point APi set initially in step 51, wherein the result thereof is an initial increment SW(i). In the current harvesting process, i.e. after at least one run of an approximation step AS according to step 57, the particular increment SW(n+1) is defined by calculating the difference between the actual value set for the working point AP(n), which results from the addition of the values of the previously determined working point AP(n−1), and the increment SW(n). The increment SW(n) is preferably set to a value that is less than the value of the aforementioned difference that is obtained. After an approximation step AS has been carried out in step 57 of the flow chart, the process jumps back to step 52 in order to dynamically account for the influences on the harvesting process, which are continually detected by the sensors. If the plausibility check according to step 56 fails repeatedly, the data base on which the at least one program map KF(n) is based can be deleted. In this case, the process returns to step 50 in order to determine at least one new initial program map KFi on the basis of a data base which has been varied in the meantime.

Figure 3:
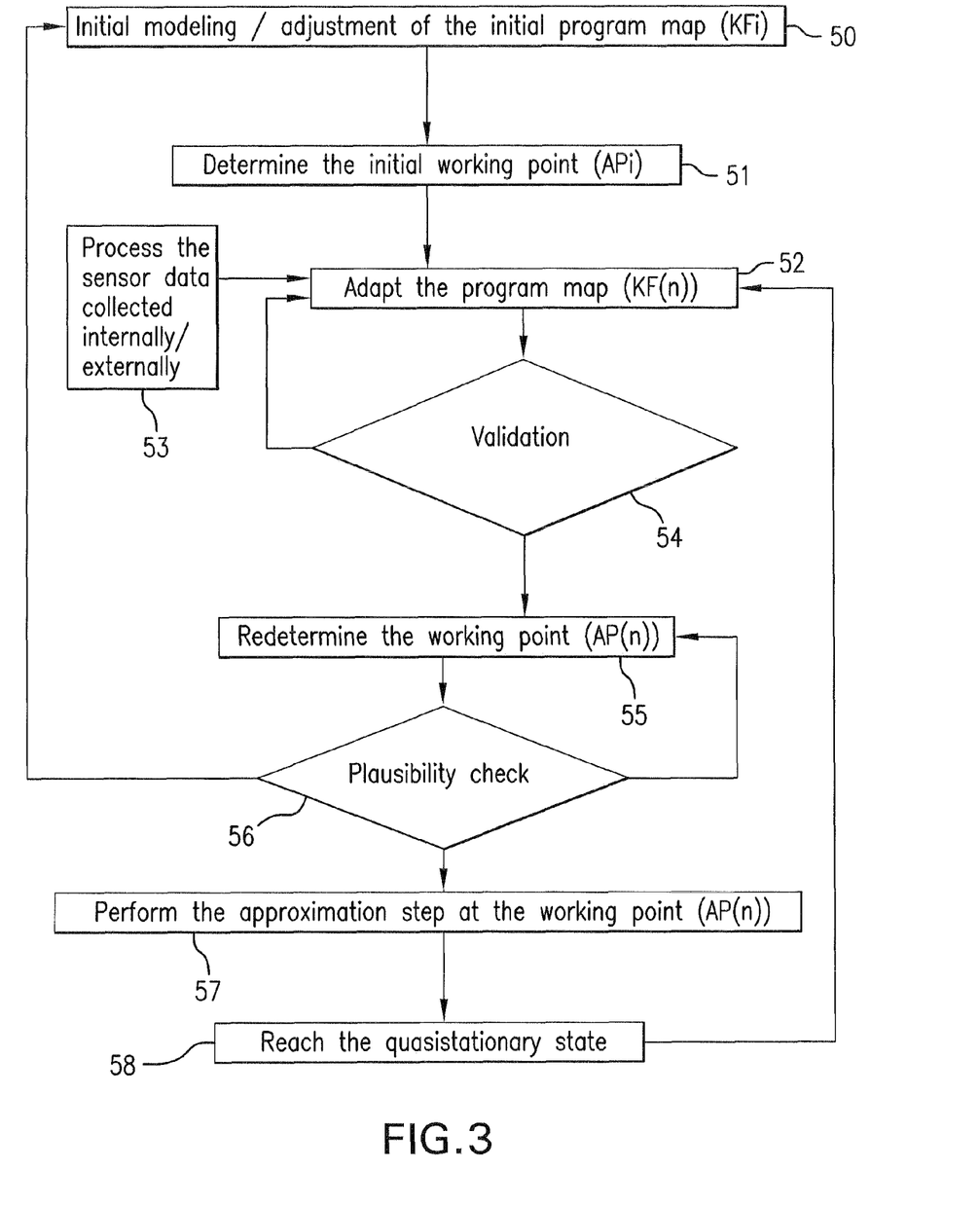
FIG. 3 shows a flow chart of a second embodiment of the method in accordance with the present invention.

FIG. 3 shows a flow chart of a second embodiment of the method. This embodiment differs from that shown in the flow chart in FIG. 2 in that, after approximation step AS has been carried out in step 57, an additional step 58 is carried out, which represents a waiting phase in the execution of the method, in which a waiting period lasting for a definable length of time ensues until a quasistationary state of harvesting machine 1 is reached before the process jumps back to step 52 for renewed adaptation of program map KF(n) with consideration for updated measurement data. The measurement data captured by the sensors are not incorporated into the optimization process during the waiting period for the quasistationary state of the working unit. This additional step makes it possible to reduce the amount of computing effort required to implement the method according to the invention. Step 54, in which the program map KF(n) is validated, therefore has greater significance, in order to identify significant deviations of the model from the actual harvesting conditions. To prevent systematic measurement errors from occurring and accumulating during a longer operation of at least one working unit in a certain working range, extreme values of the input variables are set and run on the at least one working unit in a procedure running in parallel to the method steps of adaptation of program map 52, validation 54, and plausibility check 56, at regular intervals and in alternation.

An extreme value of the input variable is always set and run once the quasistationary state is reached. In this particular case, proceeding from a first extreme value of an input variable, an outermost extreme value of the input variable, which is opposite thereto, is run once the time interval has passed. Subsequent thereto, the next higher extreme value following the first one is run and, proceeding therefrom, the lower extreme value preceding the outermost extreme value. This procedure is explained using the blower speed of blower 16 assigned to cleaning unit 17 as an example, according to which the lowest blower speed is set first, followed by the highest blower speed. Next, the second-to-lowest blower speed and the second-to-highest blower speed are set, etc. The extreme values of an input variable form "interpolation nodes" which are run to better cover the input space, within which the values of the at least one program map KF(n) are permitted to be located for purposes of the validation carried out in step 54.

The method explained above is illustrated further in the following by reference to two specific embodiments, namely adjusting the separation and adjusting the cleaning.

In the first embodiment, the method for adjusting a working unit, which is illustrated in the flow charts shown in FIGS. 2 and 3, is described with reference to the process of separation or a separating rotor. The main structural properties of a separating rotor, and those of a cleaning unit, have been known for a long time, and so the details related thereto will not be described. Performance-determining variables of a combine harvester with rotor separation are the engine output of the combine harvester, the losses due to separation, and the losses due to cleaning. The losses due to cleaning change in a negative direction as the chaff load increases, since the settings of cleaning unit 17 must be adapted accordingly in order to process the greater volumetric flow, thereby resulting in higher losses due to cleaning due to the increased volumetric flow. The chaff load is dependent on the rotational speed of the separating rotor. As the rotor speed increases, the separation of grain and chaff (the sum of non-grain components) out of the crop flow by the separating rotor increases, while a reduction in the rotor speed causes the separation of grain and chaff (the sum of non-grain components) out of the crop flow to decrease, which is associated with an increasing loss due to separation and a decreasing chaff load, thereby relieving cleaning unit 17. One objective of the method is to determine a balanced setting of the two mutually influential working units, namely the separating rotor and cleaning unit 17, thereby minimizing the losses due to separation and cleaning when considered overall.

Figure 4:
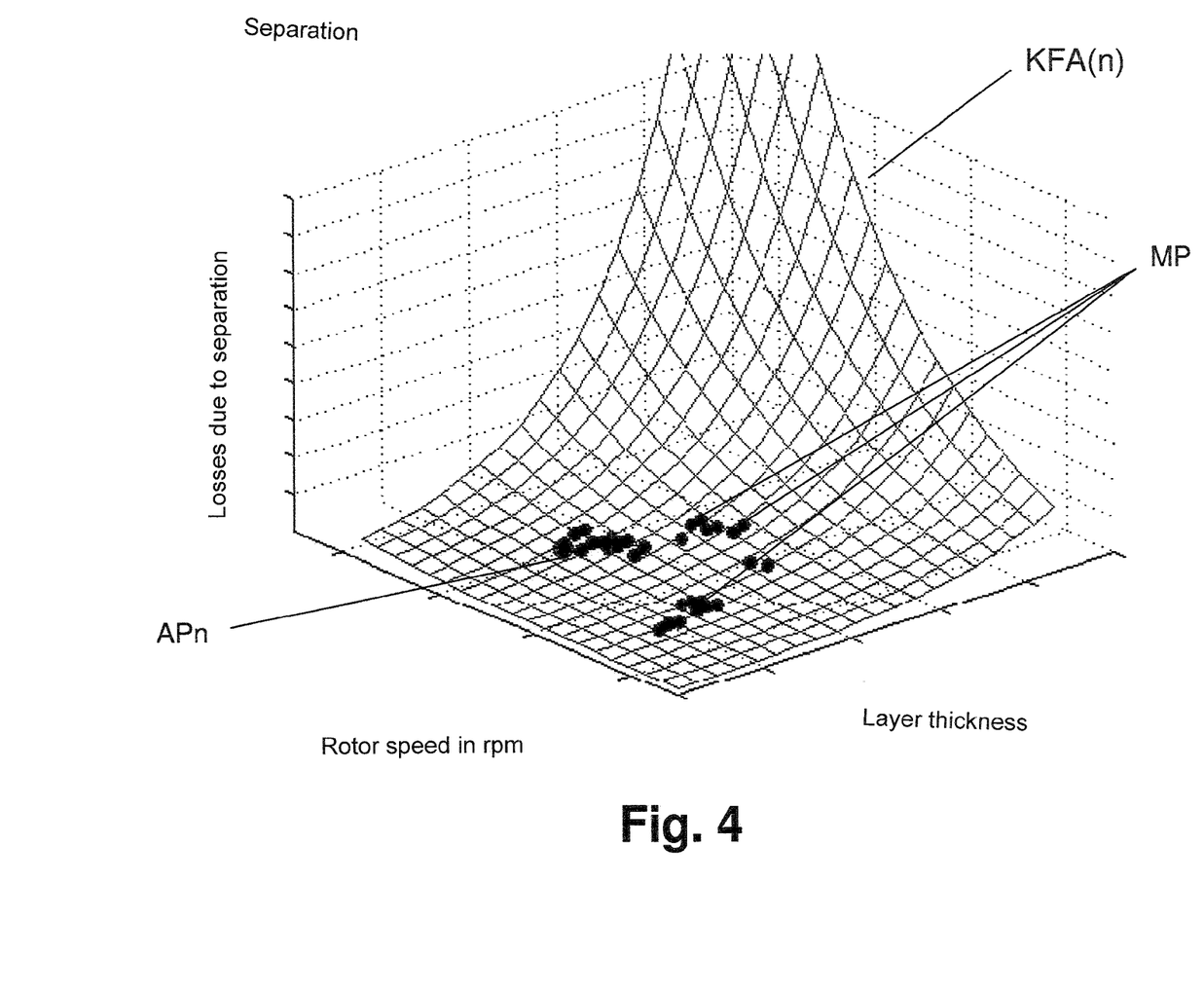
FIG. 4 shows a schematic diagram of a program map for separation in accordance with the present invention.
Figure 5:
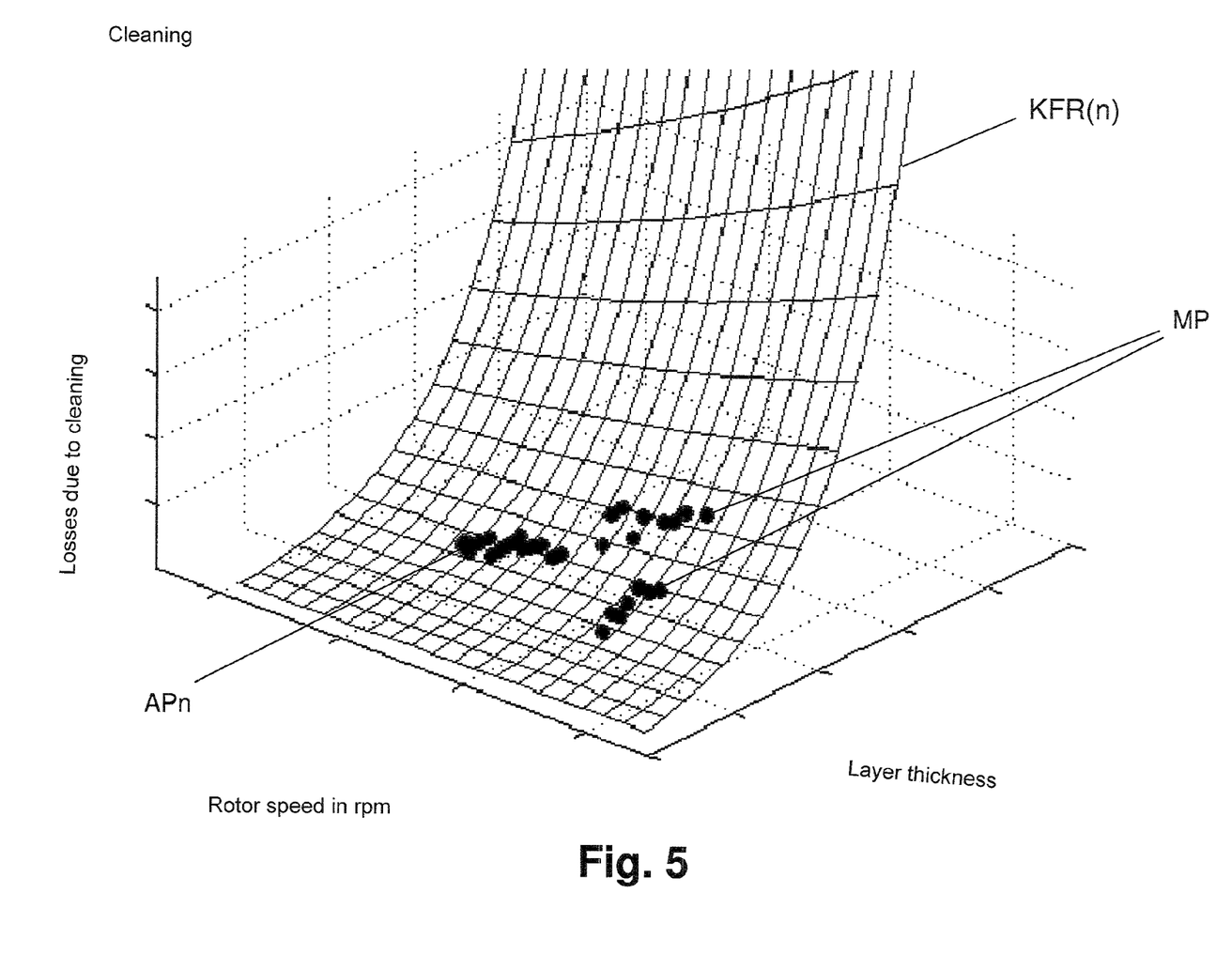
FIG. 5 shows a schematic diagram of a program map for cleaning in accordance with the present invention.

The method starts with the initial modeling of the separation process by determining two program maps KFA and KFR, as shown in FIGS. 4 and 5, one of which is for separation and the other of which is for cleaning, since interactions occur between said working units due to the change in separating rotor speed. The initial program maps KFAi and KFRi are determined e.g. on the basis of a large number of stand data for a particular kind of crop, which are collected in the previous harvesting processes, on the basis of which the initial setting of the rotational speed of the separating rotor is derived at the beginning of a new harvesting process. The possible selection of one or more input variables for determining the program map KF for the process of separation includes the rotor speed as well as the adjustment of the rotor closure flaps, the longitudinal and/or transverse inclination of combine harvester 2, or a variable which is dependent on the throughput in the various working units of combine harvester 2. The variable that is dependent on throughput can be broken down further, e.g. in terms of grain throughput and/or the layer thickness and/or the conveying speed in feed rake 6, on the return pan or the grain pan. The variables that are dependent on throughput can be determined using suitable sensors such as a layer-thickness sensor in feed rake 6.

Possible selections for one or more output variables for determining the initial program maps for the automatic adjustment of separation are, for instance, the loss due to separation, the loss due to cleaning, the power required by the separating rotor, and the grain portion or chaff portion in the tailings, or the cleanliness of the crop material in the grain tank. The at least one initial program map KR, which forms the starting point for the method, is determined on the basis of these input variables and output variables.

FIG. 4 shows, as an example, a program map KFA(n) for the separation process, in which the losses due to separation are shown as output variable as a function of the rotor speed and a variable that is dependent on throughput, such as the layer thickness in feed rake 6, as the input variable. As mentioned above, the rotor speed of the separating rotor can be determined using the speed sensor, and the layer thickness can be determined by a layer-height sensor in feed rake 6. FIG. 5 shows, as an example, a program map KFR(n) for cleaning, which depicts the losses due to cleaning as output variable, as a function of rotor speed and layer thickness. To reach the goal of a balanced setting of separation and cleaning, both program maps KFA(n) and KFR(n) are used to determine the optimal working point AP(n) of the rotor speed on the basis of the program maps KFA(n) and KFR(n), i.e. the common working point AP(n), at which the losses due to separation and cleaning are at a minimum for the current harvesting conditions. The illustration of the program map KFA in FIG. 4 shows the working point AP(n) for the rotor speed as well as additional measurement points MP which were recorded during the harvesting process. The distribution of the measurement points MP results from the fluctuations in layer thickness, which are due to stand fluctuations and fluctuating ground speeds, during the harvesting process, and from the variation of the rotor speed due to the incremental approximation of the working point AP(n). The same applies for the illustration of the program map KFR in FIG. 5.

The second embodiment relates to the adjustment of cleaning unit 17, for the adjustment of which a program map is initialized. The initial program map KFi of cleaning unit 17 is derived from stand data using a method described above. Possible input variables include, for instance, the above-mentioned variables that are dependent on throughput, the blower speed, the opening width of the upper sieve, the opening width of the lower sieve, the longitudinal and transverse inclination of combine harvester 2, and the wind board setting. The output variable can be, for instance, the loss due to cleaning, the grain portion in the tailings, the chaff portion in the tailings, and the cleanliness in the grain tank.

Another advantageous application of the method according to the invention is the prevention of disruptions of the working machine due to material flow problems, which can result in the working units becoming clogged or blocked, which in turn would limit the functionality of the method. The method according to the invention is therefore used for the purpose of safeguarding the machine functions by adapting the at least one program map KF(n) for the affected working unit to the situation, which has changed due to the disruption, and on the basis of which the new working point AP(n) is determined. The difference from the intended optimization of the harvesting process described above with regard to a balanced relationship of losses of interacting working units is that the automated adjustment according to the method, which now takes place, involves eliminating the cause of the disruption and maintaining operation of harvesting machine 1. Once the disruption has been eliminated, the method according to the invention can automatically reorient itself to the originally specified target setting.

Some of the initially stated working units, such as blower 16 or threshing part 7 or axial threshing-separating rotor, are monitored with respect to the drive speed thereof, thereby making it possible to determine slip occurring on same. The occurrence of slip on one of the working units is an indication of a disruption which can be due to material flow problems in particular. A disruption at threshing part 7, for instance, due to a clog between cylinder 8 and threshing and separating grate 12, therefore results in decreased output of combine harvester 2. Moreover, this disruption can propagate in the direction of grain-cutting device 3, since the crop material picked up by grain-cutting device 3 cannot be conveyed further as the clog of crop material becomes more pronounced. To prevent operation from becoming disrupted, measures are taken to eliminate the disruption in combine harvester 2 or in the process, or to prevent the disruption in advance. The occurrence of slip at one or more working units, which is detected by the sensors during process monitoring, results in the at least one program map KF(n) being adapted for the affected working unit, and in the determination of a new working point AP(n) which is then controlled incrementally.

Figure 6:
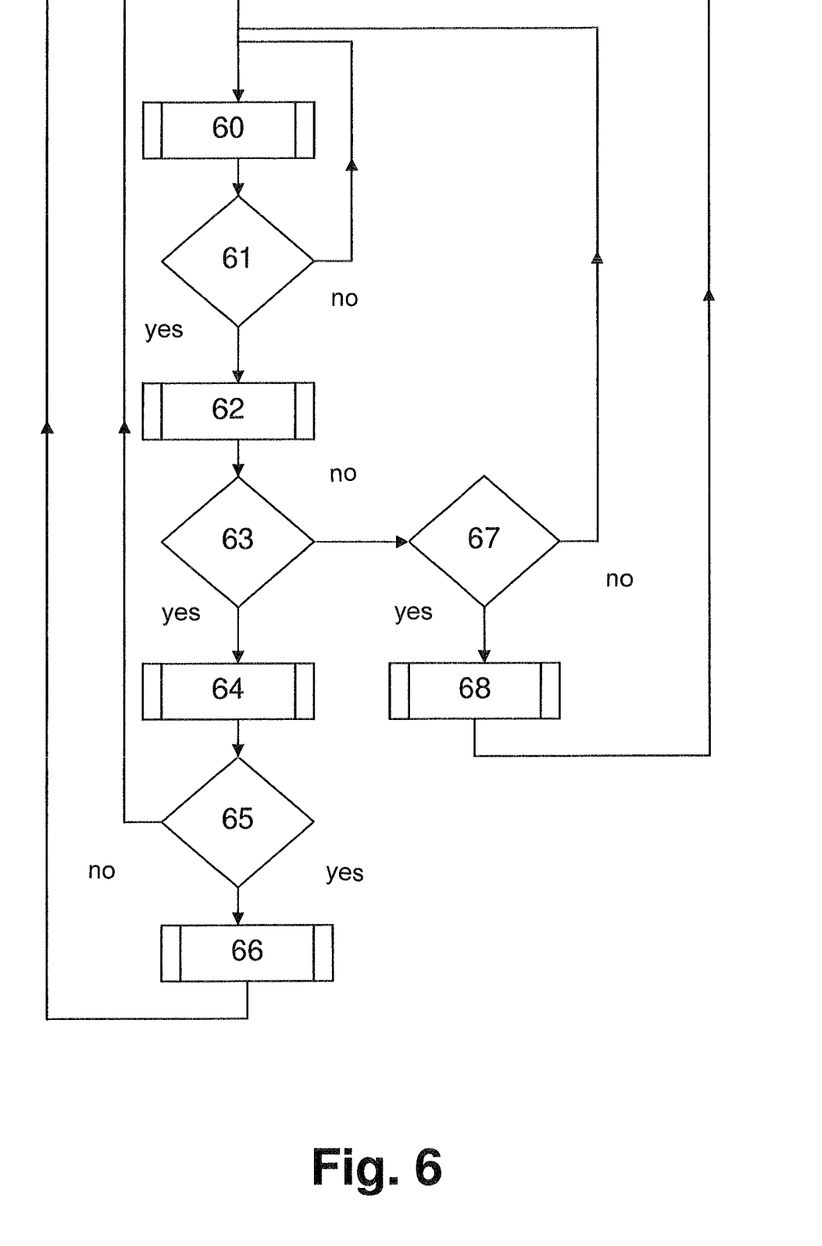
FIG. 6 shows a flow chart of a machine support function in accordance with the present invention.

This process is explained in the following, as an example, with reference to the flow chart in FIG. 6. The continuous monitoring of the working units or the determination of slip at the working units takes place in a step 60. A subsequent step 61 is used to, check whether a limit value for slip has been exceeded. For this purpose, the setpoint value and actual value for the measured slip are compared in the typical manner with a predeterminable limit value for the slip. If it is determined that the limit value has been exceeded, this affects the program map KF(n−1) that applied before the instant in which the slip occurred, and which is redetermined on the basis of the measurement values, in order to determine—on the basis thereof—a new working point AP(n) for the working unit(s) affected by the disruption. A countermeasure is initiated for this purpose in a step 62. The step can be that an attempt is made to reduce the throughput by sequentially reducing the forward-travel speed, and/or by increasing the rotational speed of the affected working unit, in order to lower the drive torque via the higher rotational speed resulting from the diminishing crop-material density in the working unit.

In a step 63, a check is carried out to determine whether the change in rotational speed of the affected working unit has resulted in a limit speed being crossed over. If the limit speed was not crossed over, the rotational speed of the working unit is increased further in step 64. To ensure that the increase in rotational speed does not result in the limit value for the slip being crossed over, the value for the slip that was measured is compared in step 65 with the default limit value minus a safety margin. If the currently measured value for the slip is less than the limit value minus the safety margin, the forward-travel speed is increased in a subsequent step 66. If the limit value for the slip, which is supposed to be monitored in step 65, minus the safety margin is crossed over, the process branches back to step 60.

However, if it was determined in step 63 that the limit speed was exceeded, a check is carried out in a step 67 to determine whether the measured slip of the working unit affected by the disruption is less than the limit slip minus the safety margin. If the measured slip is less than said limit slip, the forward-travel speed is increased sequentially. If the limit slip minus the safety margin is exceeded, the process returns to step 60.

After the disruption at the affected working unit is eliminated, a new program map KF(n+1) will be set due to the harvesting process situation in harvesting machine 1, which has changed once more, since the input variable "crop material throughput" has changed, thereby resulting in a new working point AP(n+1) which is controlled in an iterative manner according to the method.

The method according to the invention can be used preferably in a driver assistance system that comprises selectable process implementation strategies, wherein the selection criterium of a process implementation strategy is the quality of the crop material required for a certain intended use of the crop material, and/or the optimization criteria for the working units. It is used to attain, within the shortest time possible, a function of the agricultural working machine that is optimized and adapted to the customer's preference. The selection criteria can be "food plants", "seed", "feed plants", and/or "industrial plants", which require an optimized function of the agricultural working machine, which is tailored to the required quality of the crop material. The handling of the driver assistance system is particularly simple and transparent to the operator since the selection criteria and/or optimization criteria are displayed to the operator of the harvesting machine in the display unit in a selectable manner, and can be selected using a touchscreen function or a keypad. The process implementation strategy determined using the activated selection criterium and/or optimization criterium is implemented by control/regulating unit 33 which is designed to implement the method described for the automatic adjustment of at least one of several working units which interact in a harvesting process.

It will be understood that each of the elements described above, or two or more together, may also find a useful application in other types of methods differing from the types described above.

While the invention has been illustrated and described as embodied in a method for adjusting at least one working unit of a self-propelled harvesting machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method, implemented by a processor including a memory, for automatic adjustment of at least one of several working units of a self-propelled harvesting machine involved in a harvesting process, comprising the steps of:
   the processor initially modeling the harvesting process by at least one program map that tracks a current harvesting process, based on a data base characteristic of the current harvesting process;
   determining an initial working point of the at least one of the working units on a basis of the initial modeling of the harvesting process by the at least one program map;
   adapting continuously the at least one program map on a basis of data currently collected by measurements and which influence the harvesting process;
   determining a new working point of the at least one working unit of the harvesting machine depending on the continuous adapting of the at least one program map;
   approximating the setting of the working unit at the new working point in an iterative process, starting from the initial working point of the at least one working unit of the harvesting machine; and
   displaying optimization criteria of the automated process to the operator of the harvesting machine in a display unit in a selectable manner using a touchscreen function or a keypad, said optimization criteria comprising the quality of the crop material required for a certain intended use of the crop material, the optimization criteria for the working units or both;
   wherein the program map maps a separation process, in which crop loss due to separation is depicted as an output variable as a function of the rotor speed and throughput is depicted as an input variable as a function of crop layer thickness.

2. The method according to claim 1, further comprising carrying out a basic parametrization of the program map, on a basis of which initial adjustment parameters of the at least one working unit are determined.

3. The method according to claim 2, further comprising after the approximation, adapting the initial adjustment parameters of the at least one working unit to the new working point.

4. The method according to claim 3, further comprising after the approximation to the new working point, ensuing a wait for a quasistationary machine behavior to be reached.

5. The method according to claim 3, further comprising carrying out a validation of the adapted program map.

6. The method according to claim 5, further comprising depending on a result of the validation of the program map, retaining the values resulting for the working point for the adjustment parameters of the working units or resetting the values that existed in a previous working point.

7. The method according to claim 6, further comprising checking the working point resulting from the adaptation of the program map, for plausibility.

8. The method according to claim 1, further comprising carrying out the adaptation of the program map in a dynamic manner.

9. The method according to claim 1, further comprising adjusting the at least one working unit depending on a quantity of crop material supplied to the harvesting machine.

10. The method according to claim 1, further comprising adjusting the at least one working unit depending on a quantity of crop material supplied to the at least one working unit.

11. The method according to claim 1, further comprising adjusting the at least one working unit depending on an inclination of the at least one working unit.

12. The method according to claim 1, further comprising interrupting an adjustment of the at least one working unit automatically by an adjustment parameter being influenced manually.

13. The method according to claim 1, further comprising detecting and storing data obtained by measurements carried out during the harvesting process, and which influence the harvesting process.

14. The method according to claim 1, wherein the at least one initial program map describes the fundamental behavior of the at least one of the working units of harvesting machine involved in the harvesting process, and possible interactions thereof, provided they exist.

15. The method according to claim 1, wherein a parametrization of the at least one program map carried out on a basis of evaluated data gathered in previous harvesting processes, specific information about the harvesting machine, experiential knowledge of operators that was collected and combinations thereof.

16. The method of claim 1, wherein the crop layer thickness is the crop layer thickness in a feed rake.

17. A method, implemented by a processor including a memory, for automatic adjustment of at least one of several working units of a self-propelled harvesting machine involved in a harvesting process, comprising the steps of:
the processor initially modeling the harvesting process by at least one program map that tracks a current harvesting process, based on a data base characteristic of the current harvesting process;
determining an initial working point of the at least one of the working units on a basis of the initial modeling of the harvesting process by the at least one program map;
adapting continuously the at least one program map on a basis of data currently collected by measurements and which influence the harvesting process;
determining a new working point of the at least one working unit of the harvesting machine depending on the continuous adapting of the at least one program map; and
approximating the setting of the working unit at the new working point in an iterative process, starting from the initial working point of the at least one working unit of the harvesting machine;
wherein the program map maps a separation process, in which crop loss due to separation is depicted as an output variable as a function of the rotor speed and throughput is depicted as an input variable as a function of crop layer thickness.

* * * * *